United States Patent

Wanner et al.

[11] Patent Number: 5,592,710
[45] Date of Patent: Jan. 14, 1997

[54] BRUSH HEAD FOR CLEANING SURFACES

[75] Inventors: Martin Wanner, Stuttgart; Dieter Maier, Pliezhausen; Gerhard Birk, Stuttgart, all of Germany

[73] Assignee: Putzmeister-Werk Maschinenfabrik GmbH, Aichtal, Germany

[21] Appl. No.: 411,747

[22] PCT Filed: Sep. 13, 1993

[86] PCT No.: PCT/EP93/02467

§ 371 Date: May 22, 1995

§ 102(e) Date: May 22, 1995

[87] PCT Pub. No.: WO94/07389

PCT Pub. Date: Apr. 14, 1994

[30] Foreign Application Priority Data

Oct. 2, 1992 [DE] Germany .......... 42 33 161.7

[51] Int. Cl.$^6$ .................................................. B60S 3/00
[52] U.S. Cl. .................... 15/53.2; 15/52.1; 15/53.1; 15/82; 15/88.4
[58] Field of Search .......................... 15/21.1, 50.3, 15/52.1, 53.2, 53.3, 82, 88.4, 179

[56] References Cited

U.S. PATENT DOCUMENTS

| | | | |
|---|---|---|---|
| 3,584,328 | 6/1971 | Lechene et al. | 15/179 |
| 4,207,642 | 6/1980 | Arato | 15/53.3 |
| 4,691,401 | 9/1987 | Machin | 15/53.2 |
| 4,724,565 | 2/1988 | Higaki et al. | 15/53.2 |
| 4,756,044 | 7/1988 | Clark | 15/182 |
| 5,092,012 | 3/1992 | Rabourn et al. | 15/53.2 |
| 5,115,531 | 5/1992 | Suzuki | 15/53.2 |

FOREIGN PATENT DOCUMENTS

| | | |
|---|---|---|
| 1962021 | 10/1971 | Germany . |
| 2243359 | 3/1974 | Germany . |
| 2522526 | 2/1976 | Germany . |
| 8805136 | 7/1988 | Germany . |
| 3824590 | 1/1990 | Germany . |
| 4035519 | 5/1991 | Germany . |
| 9205184 | 8/1992 | Germany . |
| 605213 | 12/1977 | Switzerland . |

OTHER PUBLICATIONS

Robotersysteme, Springer–Verlag 1987; Sensoren für Roboter, by P. Levi and L. Vajta, pp. 1–15.

*Primary Examiner*—Timothy F. Simone
*Assistant Examiner*—Terrence R. Till
*Attorney, Agent, or Firm*—Flynn, Thiel, Boutell & Tanis, P.C.

[57] ABSTRACT

The invention relates to a brush head for large machines for cleaning large objects like aircraft. The brush head (18) has a brush roller (58) motor-driven in a predetermined direction of rotation (130), bearing a crown (66) of flexible, centrifugally born bristles (104) and acting with the bristles (104) against a surface to be cleaned. In order to prevent damage to the surface to be cleaned during inevitable breakdowns, the invention proposes at least one contact sensor (88), preferably rotating with the brush roller (58) and recessed inside the crown of bristles (66) to trigger an emergency stop acting on the drive system of the brush head (18).

22 Claims, 6 Drawing Sheets

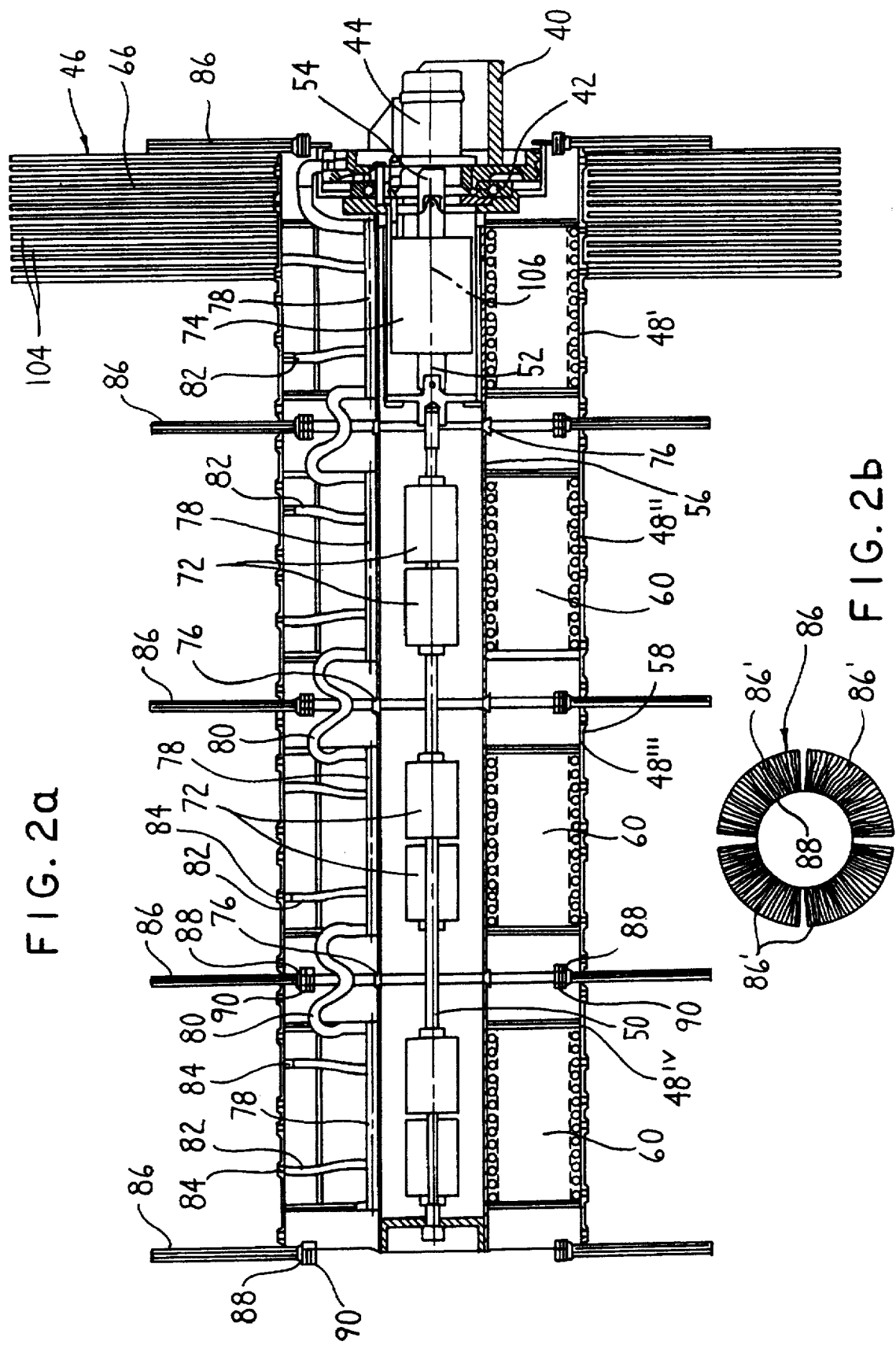

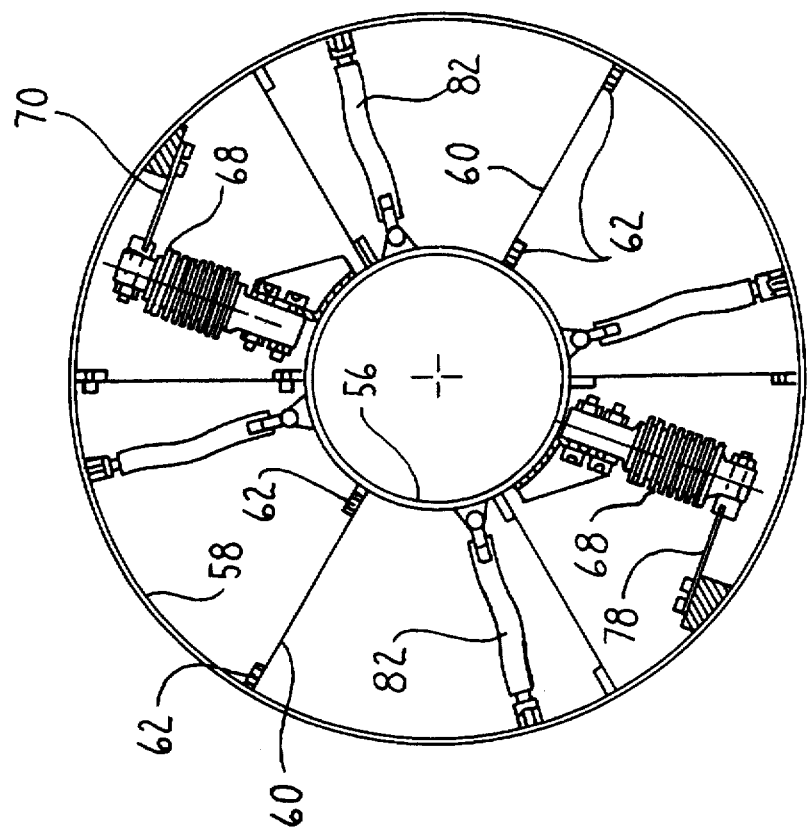
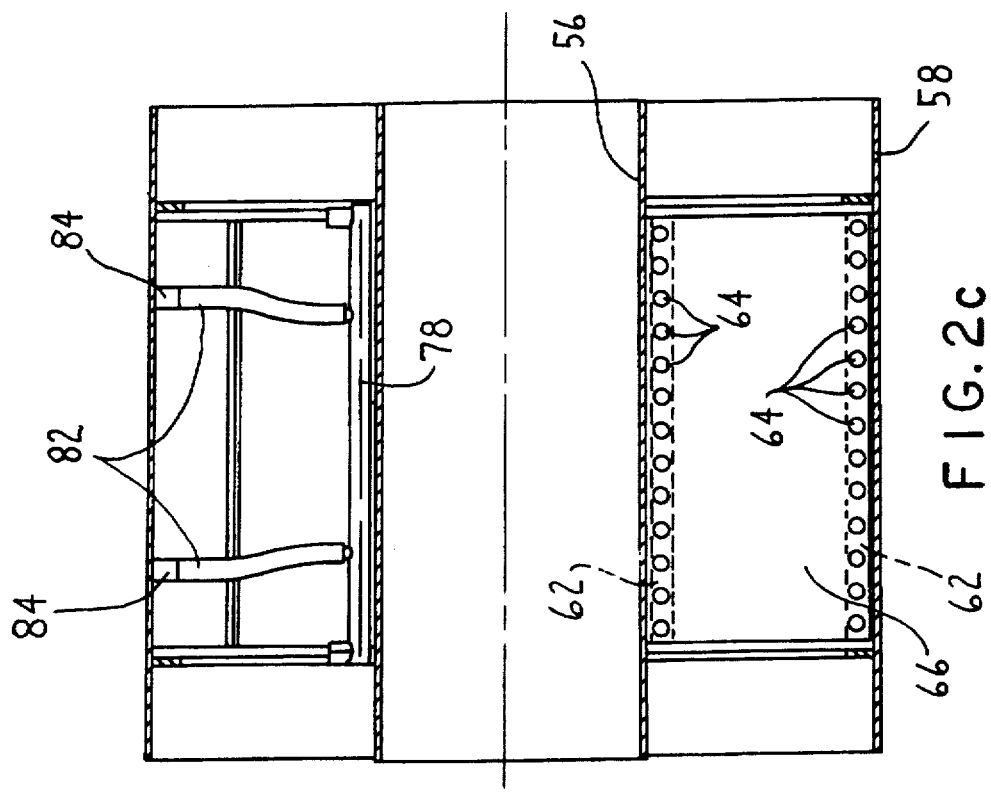

BRUSH HEAD FOR CLEANING SURFACES

FIELD OF THE INVENTION

The invention relates to a brush head, especially for the cleaning of large objects such as aircraft, having a brush roller which is motor-driven in a predefined direction of rotation, carries a bristle crown consisting of centrifugally supported, flexurally soft bristles and acts with the bristles against a surface which is to be cleaned.

BACKGROUND OF THE RELATED ART

In DE-A1-40 35 519 of the Applicant, it has already been proposed to equip a large manipulator with a remote-controllable brush head. The known large manipulator includes an articulated pole which is constructed of a plurality of extension arms which are mutually pivotable at their ends. The basic extension arm of which is mounted rotatably about a vertical axis on a bearing pedestal disposed on an underframe and the end extension arm includes a multiple joint which can be fitted with the brush head. From this publication, it is also known to assemble the brush rollers and their supporting bodies from three roller sections which can be axially separated from one another and are mounted, by means of mutually independent torque pickups, on a brush shaft. The brush shaft enables an adjustable alignment of the brush roller, relative to a surface to be worked, and according to the difference in the torques measured between the outer roller sections during the cleaning operation. With these measures, however, it is not yet possible, with certainty, to prevent damage to the surface to be cleaned.

The object of the invention is therefore to develop a brush head of the type defined in the introduction, which, in critical situations, enables an emergency cut-out of drive units so as to prevent damage to the surface to be cleaned.

SUMMARY OF THE INVENTION

The solution according to the invention is based upon the notion that, whenever a predefined depth of penetration is reached, an emergency cut-out of the manipulator carrying the brush head is effected, so that any after-running of the brush head is able to be checked. In order to achieve this, it is proposed, according to the invention, that at least one contact sensor, which is preferably jointly rotated with the brush roller and is disposed in recessed arrangement within the bristle crown, should be provided to trigger an emergency cut-out of drive units.

In order to prevent malfunctions of the contact sensor, according to a preferred embodiment of the invention the contact sensor exhibits a threshold switch, which can be set to a radial response force, for triggering an emergency off-signal. For this purpose, the contact sensor can include a sensing bristle carrier, which is disposed such that it is radially displaceable or pivotable relative to the brush roller and is fitted with a tuft of rigidly elastic sensing bristles, and a switching member, which can be actuated by the radial motion of the sensing bristle carrier, for triggering the emergency off-signal. The sensing bristles are herein shorter than and preferably about half as long as the flexurally soft bristles of the bristle crown disposed on the brush roller.

A further preferred embodiment of the invention provides that the sensing bristle carrier include a preferably spring-loaded brace for adjusting the response force of the switching member, while the switching member can be configured as a microswitch that is disposed radially within the sensing bristle carrier for triggering the emergency off-signal. For the adjustment of the switching path and hence also of the response sensitivity, a radially adjustable actuating member for the switching member can be provided on the sensing bristle carrier.

A further advantageous embodiment of the invention provides that the sensing bristle carrier is configured as a lever, which extends over part of the circumference of the brush roller and is limitedly pivotable relative to the brush roller about an axis parallel to the rotational axis, counter to the preferably adjustable force of the brace spring and against the switching member and which can be curved in the peripheral direction of the brush roller.

From the design aspect, this can be realized by virtue of the fact that the brush roller is disposed concentrically to a brush shaft, which is motor-driven in the direction of rotation, and is connected thereto by radial spacers, which are arranged scattered in the peripheral direction, are rigid in the axial and radial directions and are preferably yielding in the peripheral direction. On the driven brush shaft there is additionally disposed in a radially protruding arrangement separate from the brush roller, at least one supporting plate, which is perpendicular to the rotational axis and to the periphery of which the sensing bristle carrier is attached, preferably such that it is radially displaceable in a holding rail provided there or such that it is limitedly pivotable about an axis parallel to the rotational axis of the brush shaft. The switching member can herein be connected rigidly to the supporting plate or holding rail. The holding rail preferably exhibits a U-shaped inner profile, which is open radially outwards, while the sensing bristle carrier can exhibit an outer profile which is matched to the inner profile of the holding rail. Advantageously, the sensing bristle carrier extending in the peripheral direction is attached, close to its one end, to the holding rail, while, close to its other end, it is supported by means of the bracing spring, with adjustable pretensioning, against an outer limit stop of the holding rail. The swivel axis of the sensing bristle carrier is herein preferably disposed, in the direction of rotation, before the actuating member and before the associated brace spring wherein the actuating member is able to be disposed approximately centrally between the swivel axis and the brace spring on the sensing bristle carrier. The switching member, which is preferably configured as a microswitch or inductive switch, is preferably fastened to the supporting plate, while the actuating member disposed on the sensing bristle carrier reaches through a base aperture in the holding rail to the switching member.

A further advantageous embodiment of the invention provides that at least two, preferably two to four sensing bristle carriers are provided, which are arranged scattered over the periphery of the brush roller or supporting plate and are formed in a segment-like configuration. Accordingly, a plurality of holding rails can be provided for the reception of the sensing bristle carriers, which holding rails are open in the outward direction on the periphery of the supporting plate and combine to form a ring.

It is additionally advantageous if the brush roller is made up of at least two, preferably three or four axially interconnected roller sections fitted with a respective bristle crown. It is also preferable if, in the dividing region between two roller sections and close to the free ends of the brush roller, there is respectively disposed a sensing bristle carrier, which is disposed where appropriate on a supporting plate, or a sensing bristle ring, which is made up of a plurality of sensing bristle carriers, with the associated switching members.

BRIEF DESCRIPTION OF THE DRAWINGS

The invention is explained in greater detail below with reference to an illustrative embodiment represented diagrammatically in the drawing, in which:

FIG. 2a shows a sectional view through a brush head in an enlarged representation;

FIG. 2b shows a top view of a sensing bristle ring of the brush head according to FIG. 2a;

FIG. 2c shows a longitudinal sectional view through a roller section;

FIG. 2d shows a frontal view of a roller section;

FIG. 3b shows an enlarged detail of the sensing bristle ring according to FIG. 3a;

FIG. 4 shows a top view of a sensing bristle ring which has been modified relative to FIG. 3a.

DETAILED DESCRIPTION

Figure 1:
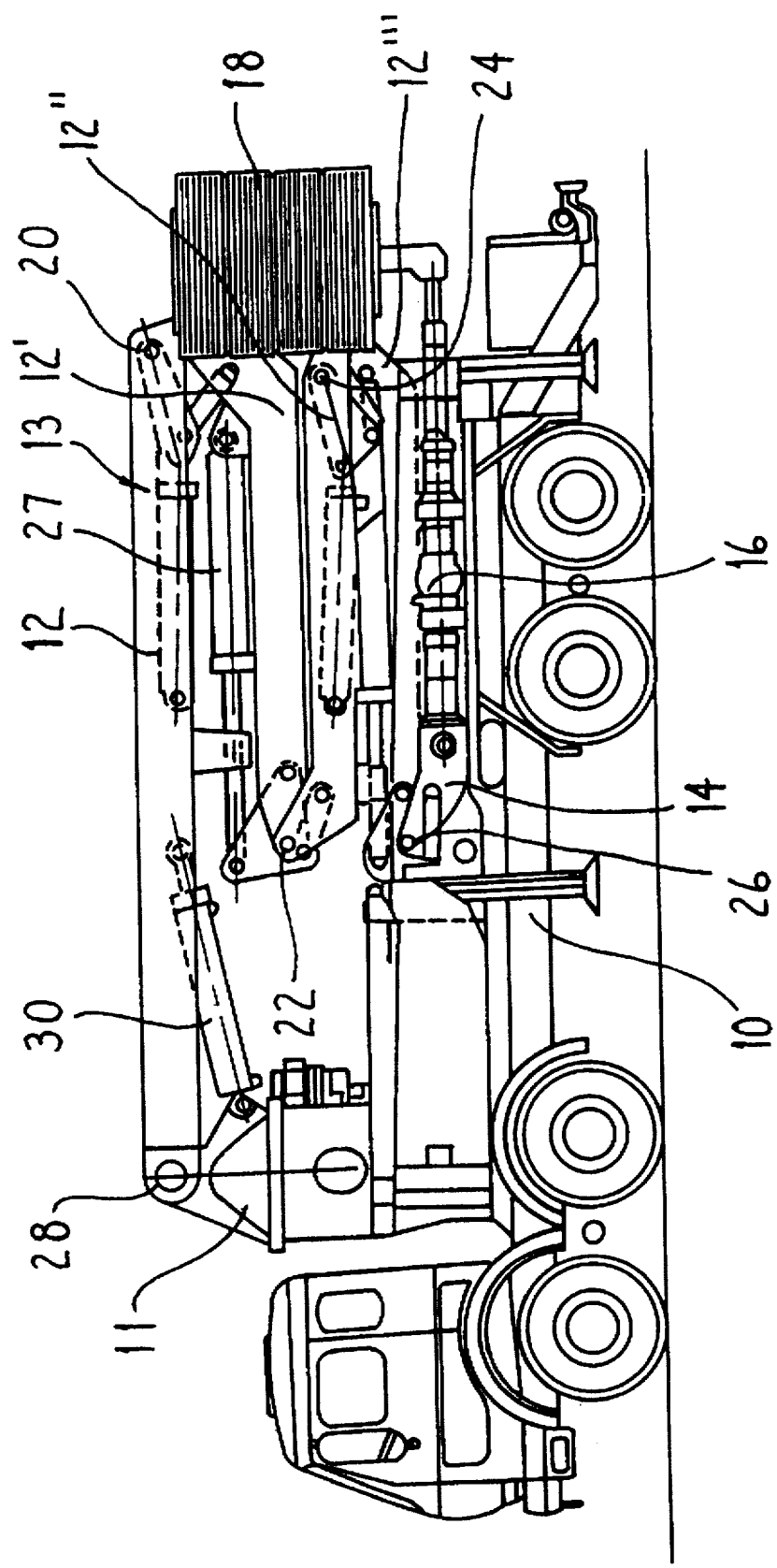
FIG. 1 shows a side view of a large mobile manipulator having an articulated pole, a multiple joint and a brush head, and is in a folded-in setting.

The mobile large manipulator which is represented in FIG. 1 essentially comprises an articulated pole 13, which is mounted on a pivot bearing pedestal 11 of a motor-driven underframe 10 such that it is rotatable with its basic extension arm 12 about a vertical axis, a multiple joint 16, which is disposed on the end extension arm 14 of the articulated pole 13, and a brush head 18, which is detachably fastened to the free end of the multiple joint. The five extension arms 12, 12', 12", 12'" and 14 of the articulated pole 13 are interconnected at their mutually facing ends, at joints 20, 22, 24, 26, such that they are limitedly pivotable about horizontal axes. The pivoting is effected by means of hydraulic cylinders 27, which are disposed at suitable points between the extension arms. The basic extension arm 12 is mounted on a horizontal bearing 28 such that it is pivotable, by means of a hydraulic drive 30, on the pivot bearing pedestal 11. In the setting shown in FIG. 1, the extension arms of the articulated pole 13 are represented in their collapsed state for transportation purposes.

The above-described arrangement makes it possible, with the brush head 18, to trace optional surface contours within the plane clamped by the extension arms. With the aid of the motor-adjustable multiple joint 16, it is additionally possible to move the brush head 18 about a plurality of rotational and thrust axes, relative to the end extension arm 14.

The brush head 18 includes a carrier 40, which is detachably fastened to the multiple joint 16 and is connected by a pivot bearing 42 to a washing brush 46 that is driven by a hydraulic motor 44. The washing brush 46 comprises, for its part, four brush sections 48' 48", 48'", 48$^{IV}$, which are interconnected by a drawbar 50 and are connected, by a Cardan shaft 52, to the drive shaft 54 of the hydraulic motor. The brush sections are respectively constructed of an inner, hollow-cylindrical shaft section 56 and an outer roller section 58, which is disposed concentrically thereto. The sections are interconnected by a plurality of thin-walled, sheet-metal spacers 60, which are disposed an angular distance apart and extend radially and axially. The spacers 60 are fastened by rows of screws 64 to radially mutually facing web bars 62 of the shaft sections 56 and of the roller sections 58. The thin-walled spacers 60 form, in the axial and radial directions, an extremely rigid connection and, in the peripheral direction, a soft connection between the roller and shaft sections. The roller and shaft sections 56, 58 are thereby able to be reciprocally twisted, in a defined manner, in the peripheral direction.

On the outer side of the roller sections 58, there is respectively disposed a bristle crown 66, which extends over the entire length and is formed of flexurally soft bristles 104, which point radially outward under the influence of centrifugal force as the washing brush rotates.

On the periphery of the shaft sections 56 there are rigidly disposed two mutually diametrically opposed weighing cells 68, which are essentially connected tangentially to the associated roller section 58 by a flexurally soft traction member 70, which is aligned counter to the direction of rotation of the washing brush. The weighing cells 68 contain a measuring bridge (not illustrated) having a wire strain gauge, which, under the influence of a force acting upon the traction member 70, emits a force-proportional measuring signal. The measuring signals are enhanced in measuring transducers 72, which are disposed inside the shaft sections 56, and are forwarded in this form, via sliding contacts 74, to an external electronic evaluation unit. The brush sections 48', 48", 48'", 48$^{IV}$ which are interconnected by drawbars 50, are mutually supported with their shaft sections 56 against intermediate rings 100 such that they are able to be reciprocally twisted so as to equalize imbalances. The shaft sections 56 thus form a continuous brush shaft, while the roller sections 58 with their bristle crowns 66 combine to form a brush roller.

The washing fluid is distributed via fluid lines 78, which extend along the shaft sections 56 parallel to the axis thereof and which are interconnected in pairs between the shaft sections 56 by flexible hose pieces 80 and are connected to an outer supply line. Moreover, branching off from the fluid lines 78 are radial spray lines 82, which emerge, via spray nozzles 84, into the bristle crown 66 and supply this with washing fluid from the inside.

Figure 3A:
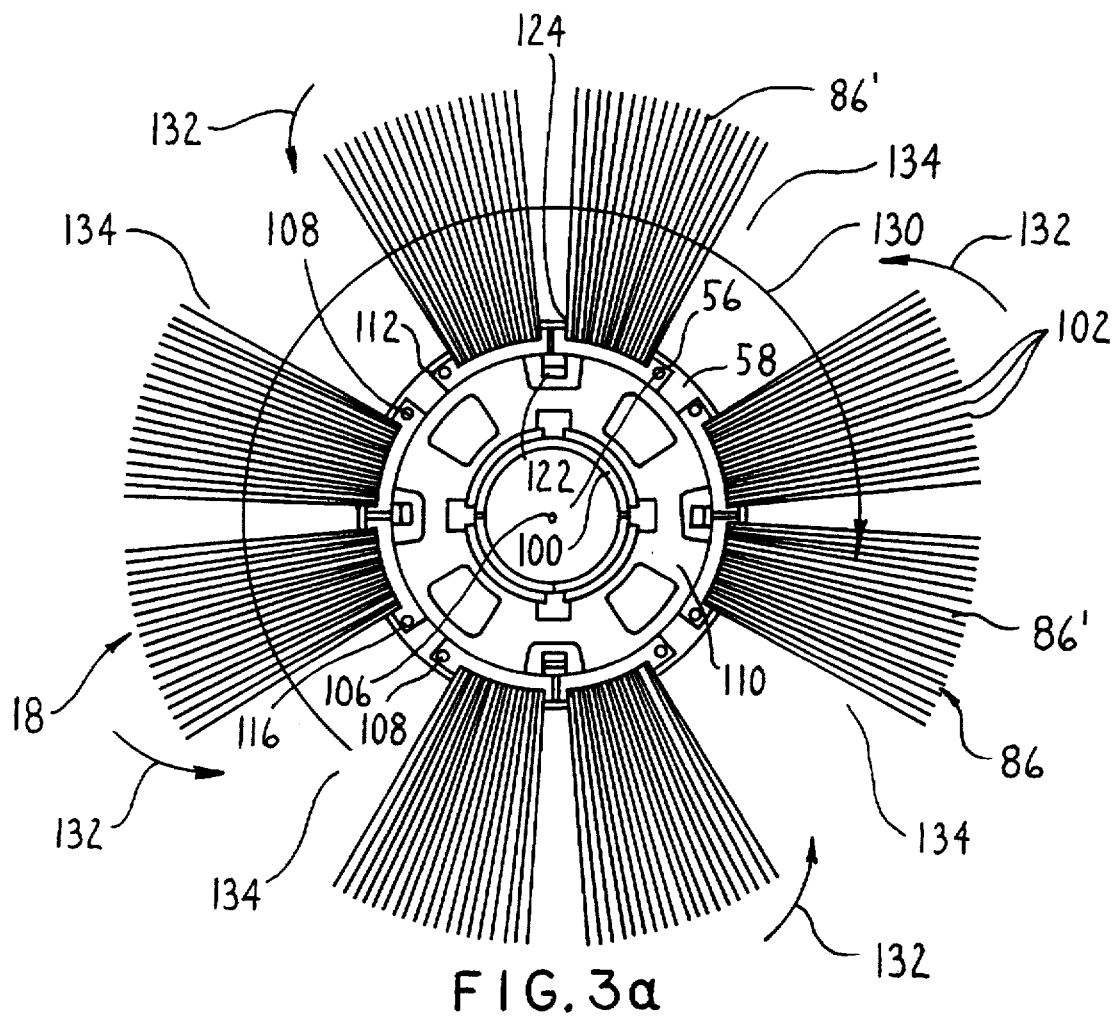
FIG. 3a shows a top view of a modified illustrative embodiment of a sensing bristle ring.
Figure 3C:
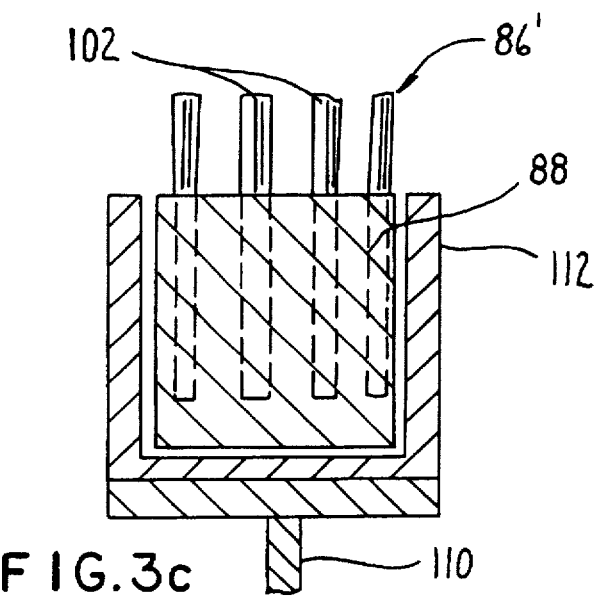
FIG. 3c shows a sectional view through the peripheral region of the sensing bristle ring according to FIG. 3b, in a selectively enlarged representation.
Figure 3B:
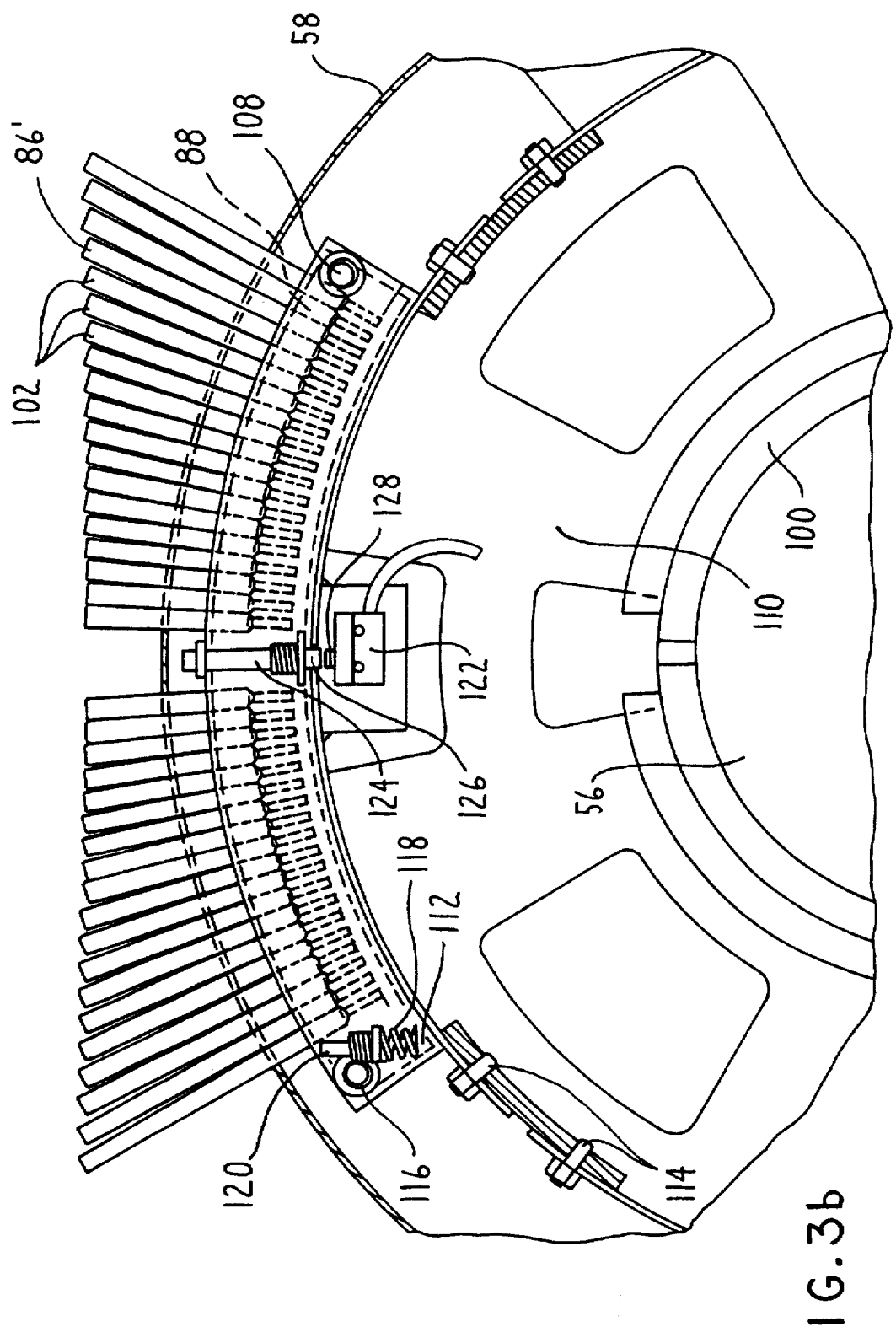

At the front ends of the washing brush 46 and in the dividing region between two roller sections 58, there is respectively disposed a sensing bristle ring 86, which is divided up into two (FIG. 4) or four (FIGS. 2b and 3a) segments 86', these being configured as contact sensors. The sensing bristles 102 are shorter than the bristles 104 of the bristle crown 66. They are connected, segment by segment, to a sensing bristle carrier 88, which, in the illustrative embodiment according to FIG. 2a, is disposed in a radial guide 90, and, in the illustrative embodiment according to FIGS. 3a to 3c, is disposed on the periphery of a supporting plate 110 so as to be pivotable about an axis 108 parallel to the rotational axis 106 of the brush roller.

The supporting plates 110 are connected, via the intermediate rings 100, separately from the roller sections 58 and rigidly to the brush shaft or the shaft sections 56, and are aligned perpendicular to the pivot axis 108. Fastened to their periphery, by threaded bolts 114, are four holding rails 112, which are U-shaped in cross-section, are open in the outward direction and are curved in the peripheral direction in the form of a segment. In the holding rails 112, respectively, one of the sensing bristle carriers 88 is limitedly pivotable in the manner of a lever, about the axis 108 between the two stops formed by the ends of the elongate hole 116. A brace spring 118, which is supported between the holding rail 112 and the sensing bristle carrier 88, ensures that the sensing bristle carrier 88, when in the rest setting, is biased under a pretensioning force against the radially outer stop within the long hole 116. The pretensioning of the spring can herein be adjusted by means of the adjusting screw 120. In the central region between the pivot axis 108 and the long hole 116 there is located a microswitch 122 on the supporting plate 110 and an actuating ram 124 on the sensing bristle carrier 88, which actuating ram, when the sensing bristle carrier 88 is pivoted, is inwardly displaceable through an aperture 126 in the base of the holding rail 112 and against the actuating member 128 of the microswitch.

Figure 4:
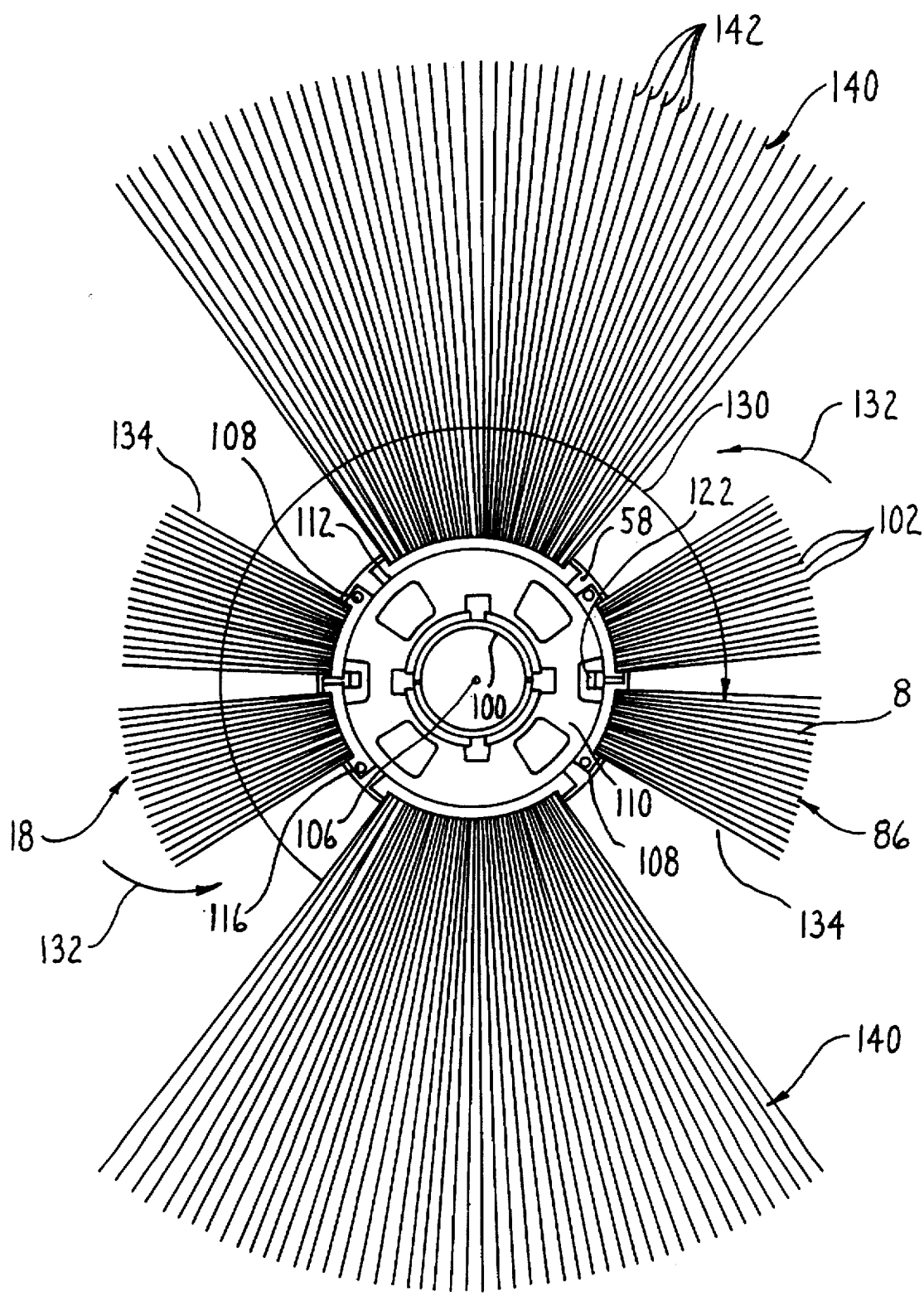

In the illustrative embodiment shown in FIG. 4, there is a segment 140 disposed on the sensing bristle ring between two respective sensing bristle segments 86' consisting of flexurally soft cleaning bristles 142 which are equal in length to the cleaning bristles on the bristle crowns 66. The effect is that no cleaning gaps are formed between the bristle crowns 66 which could result in striping during the cleaning operation.

Under the influence of the brace springs 118 and the centrifugal force of the rotating washing brush 46, the sensing bristle carriers 88 together with their sensing bristles 102 are moved outwards in the radial guide 90 or about the pivot axis 108. Under the influence of a radial force acting from without upon the sensing bristles 102 whereby the centrifugal force and the force of the counter-spring 118 are surmounted, the bristle carriers 88 are able to be displaced segment by segment against the microswitch 122 so as to trigger an emergency-off signal. As can be seen from FIG. 4, in the direction of rotation of the brush roller 46 which is indicated by the arrow 130, the sensing bristles, in the case of contact, are deflected in the direction of the arrows 132, so that they exert upon the associated sensing bristle carriers 88 a torque about the pivot axis 108, which torque is directed radially inward. It has therefore proved expedient to locate the pivot axis 108 at the front end of the sensing bristle carrier 88, in the direction of rotation 130, and locate the brace spring 118 at its rearward end. The sensitivity or threshold of the switching operation can be adjusted by means of the adjusting screw 120 and the switching point by radial adjustment of the actuating member 124 according to the requirements of the concrete application. Between the individual sensing bristle carriers there is located a free space 134, in which the sensing bristles 102 can be bent freely inward in the direction of the arrows 132.

The use of the rigidly elastic sensing bristles enables damage to the aircraft to be prevented by triggering of the emergency off-signal in such a way that even unavoidable after-running of the brush head is able to be checked. As they are immersed into the bristle crown, a force is exerted by the sensing bristles upon the sensing bristle carrier. The object is now to optimally coordinate the forces acting within the system, namely the forces acting radially outward which include:

centrifugal force acting upon sensing bristles and the sensing bristle carrier spring forces of the brace and the forces acting inward which include:

forces which act from the surface upon the sensing bristles and are dependent upon the rigidity of the sensing bristles and the depth of penetration.

Other forces which are caused by the motion of the manipulator, by accelerations or decelerations or by erratic running of the washing brush motor must not result in the emergency deactivator being triggered.

By way of summary, the following can be stated: the invention relates to a brush head for large manipulators for the cleaning of large objects, such as aircraft. The brush head 18 includes a brush roller 58, which is motor-driven in a predefined direction of rotation 130, carries a bristle crown 66 consisting of centrifugally supported, flexurally soft bristles 104 and acts with the bristles 104 against a surface which is to be cleaned. In order to prevent damage to the surface to be cleaned in the event of unavoidable faults, there is provided according to the invention at least one contact sensor 88, which preferably rotates jointly with the brush roller 58 and is disposed in a recessed arrangement within the bristle crown 66, for triggering an emergency cut-out of drive units of the brush head 18.

We claim:

1. In a brush head having a brush roller and a drive means for rotatably driving said brush roller in a predefined direction of rotation, said brush roller having a bristle crown formed of centrifugally supported, flexurally soft bristles adapted to contact against a work surface, said brush roller further having at least one contact sensor which is disposed within the bristle crown, and is displaceable relative to the said brush roller and, said brush roller further includes rigidly elastic sensing members, the improvement wherein said contact sensor includes a sensing bristle carrier and support means for supporting said sensing bristle carrier for rotation with said brush roller and for radial movement with respect to said brush roller, wherein said sensing bristle carrier is fitted with said sensing members configured as a tuft of rigidly elastic sensing bristles, and wherein a switching member is provided and is actuatable by a radial motion of said sensing bristle carrier for triggering an emergency cut-out of said drive means.

2. The brush head as claimed in claim 1, wherein said switching member is a threshold switch, which can be set to a selected said radial motion of said sensing bristle carrier, for triggering an emergency off-signal.

3. The brush head as claimed in claim 2, wherein an adjustable brace spring is provided on said sensing bristle carrier for adjustably setting an adjustable force against which said sensing bristle carrier is moved when subjected to said radial motion, and wherein said sensing bristle carrier is configured as a lever extending partially circumferentially over the brush roller, said sensing bristle carrier being pivotable relative to said brush roller about a pivot axis extending parallel to a rotational axis of said brush roller, and against the adjustable force of said brace spring and until said switching member is activated.

4. The brush head as claimed in claim 3, wherein said sensing bristle carrier is circumferentially curved around said brush roller.

5. The brush head as claimed in claim 1, wherein said sensing bristles are shorter than the flexurally soft bristles of the bristle crown.

6. The brush head as claimed in claim 1, wherein said sensing bristle carrier includes an adjustable spring-loaded brace for adjustably setting a response force against which said sensing bristle carrier is moved.

7. The brush head as claimed in claim 1, wherein said switching member is configured as a microswitch disposed radially within said sensing bristle carrier.

8. The brush head as claimed in claim 7, wherein said sensing bristle carrier supports a radially adjustable actuating member for the switching member.

9. The brush head as claimed in claim 1, wherein said brush roller is disposed concentrically to a brush shaft, which is driven by said drive means in the direction of rotation, and is connected thereto by radial spacers which are arranged spaced apart along a circumferential direction, are rigid in the axial and radial directions and are yielding along a circumferential direction, wherein at least one supporting plate is radially protrudingly attached on said brush shaft, said sensing bristle carrier is radially displaceably attached on a periphery of said at least one supporting plate, a holding rail is attached to said at least one supporting plate and is limitedly pivotable about a pivot axis extending parallel to a rotational axis of said brush shaft.

10. The brush head as claimed in claim 9, wherein said switching member is connected rigidly to said at least one supporting plate.

11. The brush head as claimed in claim 9, wherein said holding rail has a U-shaped inner profile which opens radially outwardly.

12. The brush head as claimed in claim 11, wherein said sensing bristle carrier has an outer profile which is matched to said inner profile of said holding rail.

13. The brush head as claimed in claim 9, wherein said sensing bristle carrier extends along a circumferential direction having an area near one end of said sensing bristle carrier attached to said holding rail and having an area near an other end supported by means of a brace spring with adjustable pretensioning against an outer limit stop of said holding rail.

14. The brush head as claimed in claim 13, wherein said sensing bristle carrier supports a radially adjustable actuating member for said switching member, and wherein said pivot axis of said sensing bristle carrier is disposed, in the direction of rotation, before the actuating member and before said brace spring.

15. The brush head as claimed in claim 13, wherein an actuating member is disposed generally centrally between said pivot axis and said brace spring on said sensing bristle carrier.

16. The brush head as claimed in claim 9, wherein said holding rail has a base aperture therein, and wherein said switching member, which is one of a microswitch and an inductive switch, is fastened to one of said at least one supporting plate, and wherein said sensing bristle carrier supports a radially adjustable actuating member for said switching member, and said actuating member reaches through said base aperture in said holding rail in the direction of said switching member.

17. The brush head as claimed in claim 9, wherein at least two sensing bristle carriers are provided and are arranged spaced apart over one of the periphery of the brush roller and said supporting plate, and are formed in a segment-like configuration and combine to form a sensing bristle ring.

18. The brush head as claimed in claim 17, wherein the brush roller comprises at least two axially interconnected roller sections fitted with a respective said bristle crown, and wherein, in the dividing region between two roller sections and close to the ends of said brush roller, there is respectively disposed a said sensing bristle carrier.

19. The brush head as claimed in claim 17, wherein said sensing bristle ring contains at least one bristle segment formed of longer, flexural soft cleaning bristles.

20. The brush head as claimed in claim 19, wherein said sensing bristle carriers are separated from one another along a circumferential direction by a clearance forming a free space.

21. The brush head as claimed in claim 17, wherein said brush roller comprises at least two axially interconnected roller sections fitted with a respective said bristle crown, and wherein, in the dividing region between two roller sections and close to the ends of said brush roller, there is respectively disposed said sensing bristle ring.

22. The brush head as claimed in claim 9, wherein a plurality of holding rails are provided for the reception of one of said sensing bristle carriers, which holding rails combine to form a ring on the periphery of the supporting plate and are open in an outward direction.

* * * * *

UNITED STATES PATENT AND TRADEMARK OFFICE
CERTIFICATE OF CORRECTION

PATENT NO. : 5 592 710
DATED : January 14, 1997
INVENTOR(S) : Martin WANNER, et al.

It is certified that error appears in the above-indentified patent and that said Letters Patent is hereby corrected as shown below:

```
Column 6, line 47; delete "and" (first occurrence).
         line 53; change "bristles" (first occurrence)
                  to ---members---.
```

Signed and Sealed this

Ninth Day of September, 1997

Attest:

BRUCE LEHMAN

Attesting Officer          Commissioner of Patents and Trademarks